United States Patent
Hanmann et al.

(10) Patent No.: US 6,690,882 B1
(45) Date of Patent: Feb. 10, 2004

(54) METHOD OF OPERATING A DISK DRIVE FOR READING AND WRITING AUDIOVISUAL DATA ON AN URGENT BASIS

(75) Inventors: Jonathan L. Hanmann, Anaheim, CA (US); Kenneth J. D'Souza, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/406,327

(22) Filed: Sep. 27, 1999

(51) Int. Cl.⁷ .................................................. H04N 5/91
(52) U.S. Cl. ...................................... 386/125; 386/126
(58) Field of Search ............................ 386/46, 96, 98, 386/104, 105, 111, 112, 116, 125, 126, 68

(56) References Cited

U.S. PATENT DOCUMENTS 6,332,057 B1 * 12/2001 Kawamura et al. ........... 386/95
6,370,325 B2 * 4/2002 Nahatani et al. ............ 386/126

* cited by examiner

Primary Examiner—Huy Nguyen
(74) Attorney, Agent, or Firm—Milad G. Shara, Esq.; Myers Dawes Andras & Sherman

(57) ABSTRACT

A method of operating an audiovisual disk drive having a default audiovisual mode for more efficiently transferring audiovisual data from or to a host pursuant to audiovisual host commands. The innovative method includes the steps of receiving a new transfer command requiring the transfer of a data segment associated with the audiovisual data stream; determining an absence or presence of an urgent condition with regard to the new transfer command; according standard precedence to processing the audiovisual data stream associated with the new transfer command as specified by the default operating mode in the determined absence of the urgent condition; and according urgent precedence to processing the audiovisual data stream associated with the new transfer command over attending to the other drive operation in the determined presence of the urgent condition without regard to the default operating mode. The preferred embodiment determines the absence of presence of the urgent condition by testing an urgent bit that may be set or reset by the host in each audiovisual host command.

18 Claims, 7 Drawing Sheets

METHOD OF OPERATING A DISK DRIVE FOR READING AND WRITING AUDIOVISUAL DATA ON AN URGENT BASIS

BACKGROUND OF THE INVENTION

1. Field of the Invention

The present invention relates generally to magnetic disk drives and, more particularly, to a method of managing the reading or writing of audiovisual data from the disk drive in accordance with the absence or presence of an urgent condition.

2. Description of the Related Art

Personal computer (PC) makers have adopted magnetic disk drives as the mass storage device of choice, on an almost universal basis, because of their speed, capacity, and low cost.

The most popular standard for interfacing a host computer with a disk drive is the Enhanced Integrated Drive Electronics (EIDE) or AT Attachment-2 (ATA-2) specification. Under the EIDE specification, the host PC commands the magnetic disk drive to read data from or write data to the disk drive starting at a particular "sector" location on the drive's rotating media and continuing for a specified number of "sectors" ranging from only 1 sector to as many as 256 sectors. Sector size may differ from drive to drive, but a standard sector has come to contain 512 bytes of data. The location of a particular sector may be specified as a physical location (e.g. a particular Cylinder, Head, and Sector or CHS location), or, as is now more common, as a logical location (e.g. a particular Logical Block Address or LBA) that the drive translates into a physical location.

The conventional EIDE disk drive reads or writes sectors as commanded by the host PC. It does not "know" that any particular sector is associated with any particular data file (or AV objects as discussed below) because the host PC's operating system is solely responsible for keeping track of the association between sectors and data files (or AV objects). The typical host PC is controlled by an operating system that:

(1) maintains a file directory containing a list of file names and associated "start" clusters (aka "allocation units", one cluster or one allocation unit being a particular number of sectors);

(2) maintains a separate "linked list" of clusters; and (3) instructs the drive where to read or write such clusters based on a start cluster from (1) and, if necessary, from the linked list of subsequent clusters from (2).

One familiar structure of this nature is the directory and associated file allocation table (FAT) first introduced in the well-known disk operating system called DOS.

While speed is always desirable, nothing catastrophic would occur if a disk drive were delayed in reading or writing a particular cluster of a standard data file due to multiple retries and the like. The overall data file would just be read from or written to the disk later than normal. Accordingly, a conventional disk drive that stores only standard data files operates with more emphasis on making sure that it accurately reads or writes the data rather than on making sure that it reads or writes the data with any sort of urgency.

However, disk drives traditionally used for storing standard discrete data files have recently become viable candidates for also storing and playing back audiovisual objects (e.g. movies or songs). It has become practical to store audiovisual objects on such disk drives because of the ever-increasing capacity of consumer-priced disk drives (exceeding 20 GB at the present time) and the emergence of ever more practical compression techniques for audiovisual objects (e.g. video images compressed according to the standards promulgated by the Motion Picture Experts Group such as MPEG-2 or audio tracks compressed according to the MP3 format). A 20 GB drive, in fact, has sufficient capacity to store about 5–20 hours of video data using readily available hardware and/or software compression techniques and depending on desired quality.

Unlike a data file, the reading and writing of AV data corresponding to an "audiovisual object" is very time sensitive. For this reason, the "flow" of data making up an audiovisual object is often regarded as an audiovisual data stream. As suggested by the terminology, an AV data stream is a long, continuous series of AV data groups that must each be handled in a timely manner or be irretrievably dropped. When writing to the disk drive, for example, the AV data stream may flow relentlessly into the disk drive without regard to the status of the drive's write-cache (likely shared between streams) and whether or not the disk drive has written the preceding AV data from the cache to the media. A failure to write the incoming AV data in a timely manner may result in an "overflow" situation drive's buffer memory whereby some of the AV data is lost. Similarly, when reading AV data from the disk drive for playing back a movie or song, the playback device has a relentless need for new video frames or audio segments regardless of whether or not the disk drive has read the succeeding AV data corresponding to the new frames or segments and stored such data in the read-ahead cache. Under certain drive conditions, such as when the host is recording and/or playing back multiple AV streams, a failure to have the required AV data preloaded in the read-ahead cache may result in skipped frames or segments that are visually or audibly annoying to the user.

A disk drive used for storing audiovisual data streams is likely to be used for storing conventional data files too. A conventional disk drive uses only one head at a time. Nonetheless, given sufficient capacity and speed, a dual-purpose disk drive may "simultaneously" read and write multiple data files while processing multiple AV data streams. The drive may, for example, rapidly turn its attention to the successive operations needed for loading a spreadsheet file into memory, storing one AV data stream, and playing back another AV data stream.

A disk drive that is adapted for storing an AV data stream may have insufficient opportunity from time to time, due to having to tend to other drive operations, to ensure that the AV data is accurately written to or read from the drive. In apparent acknowledgment of this concern, others have proposed toggling the drive between two major modes:

(1) a default data mode designed to accurately transfer data files to or from the disk with conventional error recovery routines such as multiple retries, and the like, fully enabled; and (2) a default AV mode designed to rapidly transfer AV data streams to or from the disk with suitable time limitations, and the like, imposed on the normal error recovery routines.

Because the disk drive normally stops transferring data altogether upon detecting an error, it has also been proposed that the default AV mode includes an optional "read continuous" mode wherein the AV data stream is continuously transferred notwithstanding such an error, without stopping to perform error recovery procedures, since transmitting some erroneous AV data may be better than transferring no data at all.

The foregoing provision of a default AV mode, including a read continuous mode, beneficially tends to transfer an AV data stream in an expedient manner. The default AV mode of this nature, however, does not consider the possibility that unavoidably "urgent" situations may arise in the host, or in the disk drive itself, with respect to the A/V data stream where there is only one or with respect to a particular AV data stream where there are several. The host, for example, may include a receive buffer that stores a certain amount of AV data previously read from the disk drive to accommodate the need to immediately display such data and the possibility that the disk drive will take longer than expected to transfer later requested information. The host's receive buffer may become near-empty and create an "urgent" condition from the host's point of view. As another example, the disk drive itself may have a read-ahead buffer that is used to temporarily store data that the drive anticipates the host will request based, for example, on such data being stored at disk locations that are immediately consecutive to the location of previously requested data. The drive's read-ahead buffer may also become near-empty, the latter condition being a potentially urgent condition from the drive's point of view.

In view of the above, there remains a need for a disk drive that is adapted for reading and writing an AV data stream with less probability of dropping data.

SUMMARY OF THE INVENTION

This invention can be regarded as a unique method of operating a disk drive that is adapted for storing an audiovisual data stream on a disk and for rapidly reading or writing successive portions of the audiovisual data stream in response to commands that arrive from a host under a variety of operational circumstances including other drive operations and includes the step of setting (202) a default operating mode for responding to the commands which gives standard precedence to transferring the audiovisual data stream relative to attending to another drive operation, the default operating mode including a read continuous mode which causes the disk drive to continuously read successive portions of a subsequently requested audiovisual data stream without regard to error. The innovative method comprises the further steps of: receiving (204) a new transfer command requiring the transfer of a data segment associated with the audiovisual data stream; determining (206) an absence or presence of an urgent condition with regard to the new transfer command; according standard precedence (220) to processing the audiovisual data stream associated with the new transfer command as specified by the default operating mode in the determined absence of the urgent condition; and according urgent precedence (230) to processing the audiovisual data stream associated with the new transfer command over attending to the other drive operation in the determined presence of the urgent condition without regard to the default operating mode.

DETAILED DESCRIPTION

The following embodiment is directed to a method of operating a disk drive that is capable of responding to a request for "urgent" processing of a particular read or write command related to an AV data stream or of imposing an "urgent" processing mode on a particular read or write command related to an AV data stream.

Figure 1:
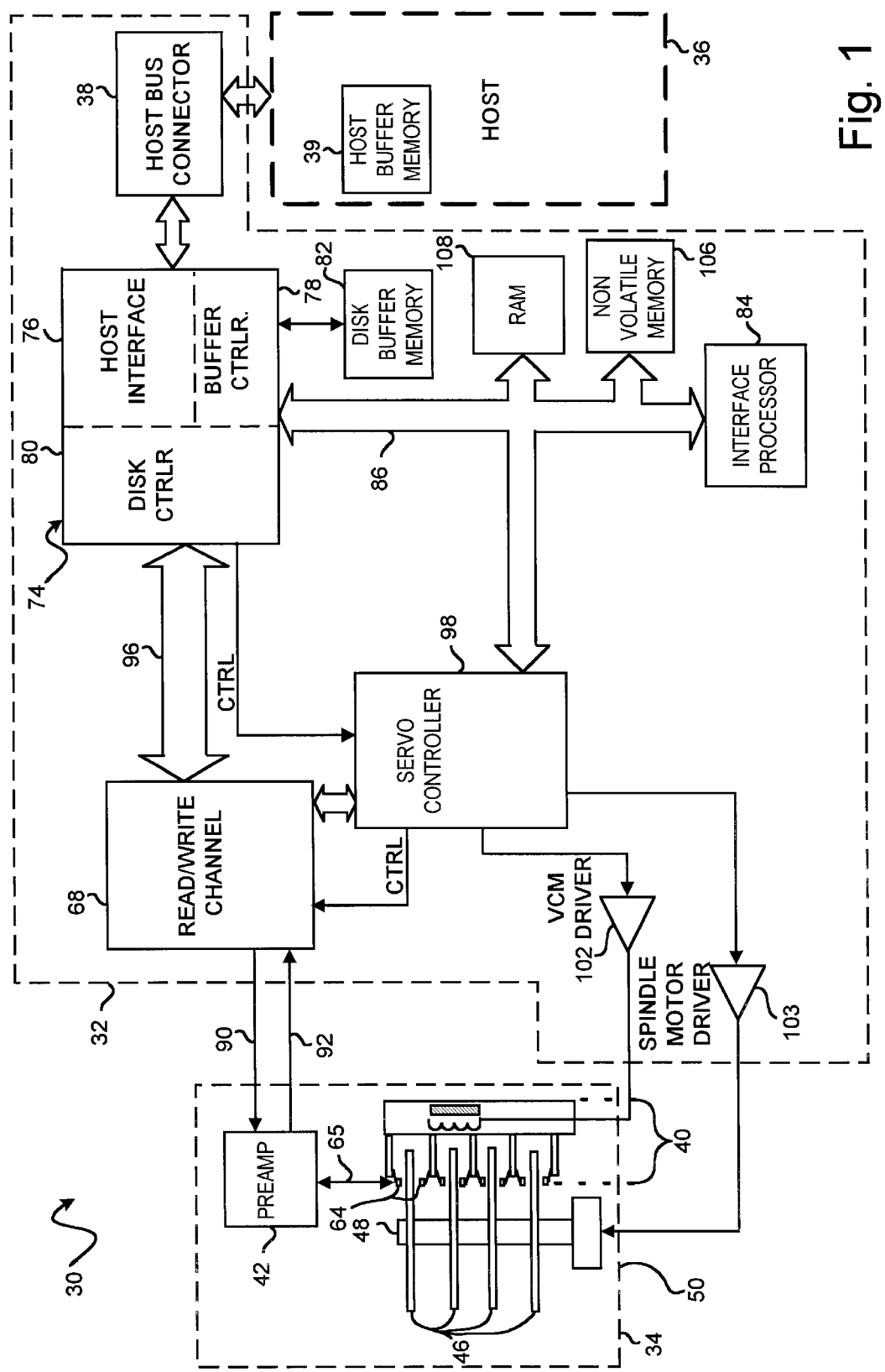
FIG. 1 is a block diagram of a disk drive in which the method and apparatus of the invention may be practiced.

FIG. 1 shows a block diagram of a disk drive 30 in which the invention may be practiced and of a host computer 36 that contains a host buffer memory 39 for temporarily storing data that was received from or will be sent to the disk drive 30. The disk drive 30 is connected to the host computer 36 via a host bus connector 38 for the transfer of commands, status and data. Although any desired interface may be used, one suitable standard for such connection is the Enhanced IDE (EIDE) standard presently favored for desktop personal computers. Disk drive 30 comprises a Head/Disk Assembly, HDA 34, and a controller printed circuit board assembly, PCBA 32.

The HDA 34 comprises: one or more disks 46 for data storage (four shown); a spindle motor 50 for rapidly spinning the disks 46 on a spindle 48; and an actuator assembly 40 for swinging a plurality of heads 64 in unison over each disk 46. The heads 64 are connected to a preamplifier 42 via a cable assembly 65 for reading and writing data on the disks 46. A preamplifier 42 is connected to channel circuitry in controller PCBA 32 via read data line 92 and write data line 90.

The controller PCBA 32 comprises a read/write channel 68, servo controller 98, host interface and disk controller (HIDC) 74, voice coil motor driver (VCM driver) 102, spindle motor driver (SMD) 103, microprocessor 84, and several memory arrays—disk buffer memory 82, RAM 108, and non-volatile memory 106.

Host initiated operations for reading and writing data in disk drive 30 are executed under control of microprocessor 84 connected to the controllers and memory arrays via a bus 86. Program code executed by microprocessor 84 is stored in non-volatile memory 106 and random access memory RAM 108. Program overlay code stored on reserved tracks of disks 46 may also be loaded into RAM 108 as required for execution. In particular as described in detail below, microprocessor 84 executes the method of the invention.

During disk read and write operations, data transferred by preamplifier 42 is encoded and decoded by read/write channel 68. During read operations, channel 68 decodes data into digital bits transferred on an NRZ bus 96 to HIDC 74. During write operations, HIDC 74 provides digital data over the NRZ bus 96 to channel 68 which encodes the data prior to its transmittal to preamplifier 42. Preferably, channel 68 employs PRML (partial response maximum likelihood) coding techniques, although the invention may be practiced with equal advantage using other coding processes.

HIDC 74 comprises a disk controller 80 for formatting and providing error detection and correction of disk data, a host interface controller 76 for responding to commands from host 36, and a buffer controller 78 for storing data which is transferred between disks 46 and host 36. Collectively the controllers in HIDC 74 provide automated functions which assist microprocessor 84 in controlling disk operations.

A servo controller 98 provides an interface between microprocessor 84 and actuator assembly 40 and spindle motor 50. Microprocessor 84 commands logic in servo controller 98 to position actuator 40 using the VCM driver 102 and to precisely control the rotation of spindle motor 50 with the spindle motor driver 103.

The disk drive 30 preferably employs a sampled servo system in which equally spaced servo wedge sectors are recorded on each track of each disk 46. Data sectors are recorded in the intervals between servo sectors on each track. Since the servo sectors are aligned along radial lines between the center of the disk and an outer diameter, they appear to divide the disk into "wedges" and a particular radial line may be termed a wedge position. Conventionally, servo sectors are recorded at each wedge on each track with track identification, wedge number and servo tracking information. One wedge position is designated as an index. Servo wedge sectors are sampled at regular intervals to provide servo position information to microprocessor 84. Servo sectors are received by channel 68, and are processed by servo controller 98 to provide position information to microprocessor 84 via bus 86.

Figure 2A:
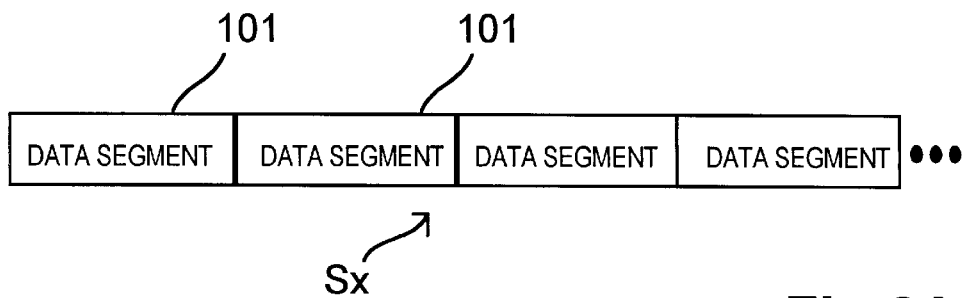
FIG. 2A is a block diagram of an audiovisual data stream comprising multiple audiovisual data segments.

FIG. 2A shows a block diagram of an audiovisual data stream Sx comprising multiple successive portions or segments 101 which may be stored on disk drive 30.

Figure 2B:
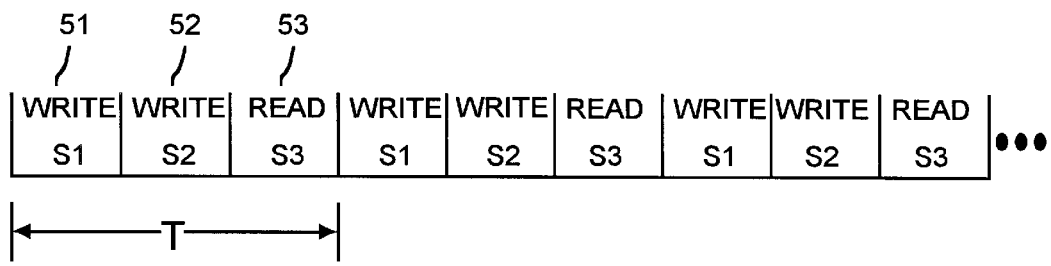
FIG. 2B is a diagram showing an exemplary approach to concurrently reading and/or writing a plurality of data streams (three in this case) comprising the audiovisual data segments using the disk drive of FIG. 1.

FIG. 2B is a simplified diagram showing one approach to reading and/or writing multiple AV data streams S1, S2, S3 (three in this case), wherein an orderly succession of command times 51, 52, 53 are made available to each AV stream S1, S2, S3 during a fixed period of time "T". In operation, each AV data stream must read or write a sufficient amount of data during the allotted command times 51, 52, 53 in order to maintain a minimum required data rate. An error in reading or writing data, of course, may occur in a command time 51, 52, 53. Under the default AV mode discussed above, the disk drive 30 will attempt to correct the error to the extent there is some remaining time in the allotted command time 51, 52, 53 and, if the "read continuous" mode is in effect, will read through an error without stopping.

Figure 3:
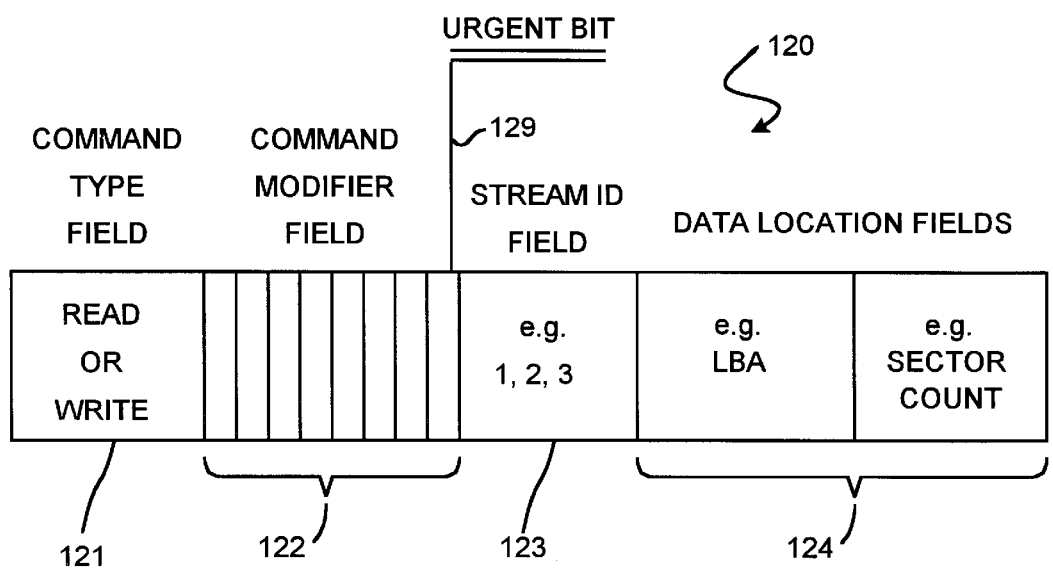
FIG. 3 is a diagram of an audiovisual command structure that includes an urgent bit which may be issued by the host to more efficiently control the disk drive of FIG. 1.

FIG. 3 shows a command structure for implementing an urgent mode in a preferred embodiment of this invention. In this case, the host 36 of FIG. 1 communicates with the disk drive 30 using a command protocol that includes a host transfer command 120 suitable for reading or writing data segments corresponding to one or more audiovisual data streams, in addition to other commands. As shown, the host transfer command 120 includes a command type field 121 (e.g. Read or Write), a command modifier field 122, a stream ID field 123 (e.g. 1, 2, 3 and so on), and one or more data location fields 124 (e.g. a logical block address LBA and a sector count). Of significance, the command modifier field 122 in the host transfer command 120 includes an urgent bit 129 that the host 36 may selectively set or reset in order to inform the host interface 76 in the disk drive's HIDC 74 as to the urgency of this particular command 120.

Figure 4:
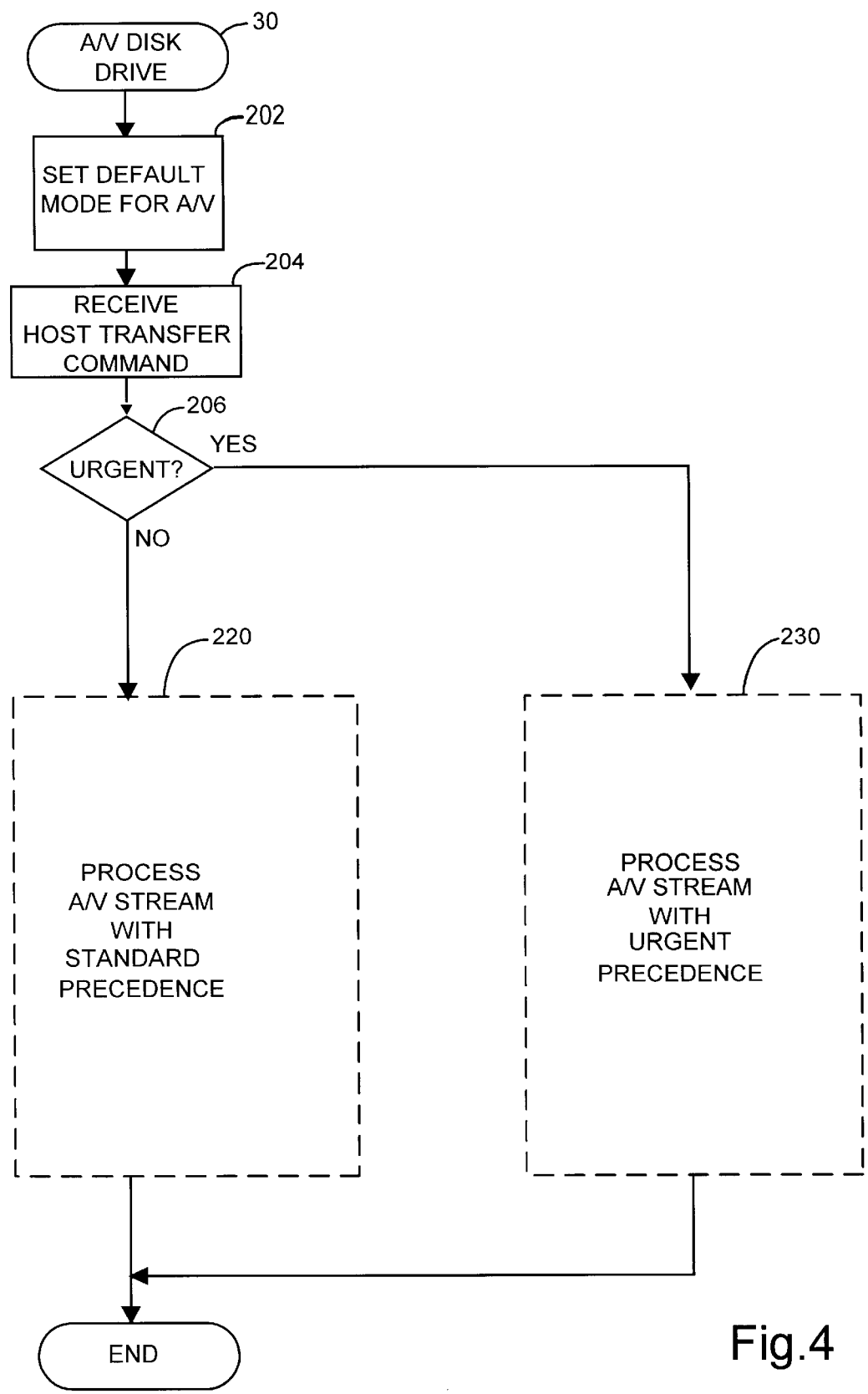
FIG. 4 is a generalized flow chart of audiovisual command within the disk drive of FIG. 1.

FIG. 4 is a flow chart showing how the HIDC 74 in the disk drive of FIG. 1, operating according to one embodiment of this invention, may control the disk drive 30 so as to more effectively process the host transfer commands 120 related to an AV stream. As shown in FIG. 4, the preferred method includes a step 202 wherein the drive is placed into a default AV mode that is overall more suitable for the transfer of AV data as opposed to conventional file data. As discussed above, the default AV mode preferably includes AV-specific features such as read continuous operation in the event of an error, and so on.

At step 204, the disk drive 30 receives a host transfer command 120 related to an AV stream such as a Read command or a Write command. FIG. 3 discussed above shows a generalized AV transfer command 120, but the precise format may vary in actual use from embodiment to embodiment. As noted above, the host command 120 comprises a Command Type Field 121 (e.g. READ or WRITE), a Command Modifier Field 122 (e.g. bits of predefined meaning that may be set or reset by the host 36), a Stream ID Field 123 (for associating the command with a particular AV stream), and Data Location Fields 124 (e.g. LBA and Sector Count fields, as shown, or other location information such as Cylinder, Head and Sector fields).

In this embodiment, the Command Modifier Field 122 contains an "Urgent Bit" 129 that the host 36 controllably sets or resets in each command in order to specify the precedence to be afforded to the command relative to other drive operations such as error checking, the processing of other previously issued commands, and the like. There are many scenarios that might lead the host 36 to set the Urgent Bit. For example, the host 36 may declare a particular READ command as Urgent because the host's buffer memory 38 is near-empty and the likelihood of a streaming lapse is imminent. Conversely, the host may declare a particular WRITE command as Urgent because the host's buffer memory 38 is near-full and it needs to immediately make room for additional AV data.

At step 206, the HIDC 74 checks the status of the urgent bit. The Urgent Bit, for example, may be set to "1" and reset to "0." If the Urgent Bit is not set, the process proceeds to step 220 where the processing of the Host Command and/or A/V stream associated with the Host Command is given "standard precedence" relative to other drive operations, i.e. is simply processed according to the default A/V mode set in Step 202. If the Urgent Bit is set, however, the process proceeds to step 230 where the processing of the Host Command and/or A/V stream associated with the Host Command is given "urgent precedence" and processed differently than it would normally be processed according to the default A/V mode set in Step 202, i.e. without delay whatsoever for error processing, in an order other than the order that the command was received, with precedence given to pre-reading of this command over post-reading of a prior command, and so on. There are many ways of responding to the Urgent Bit.

Figure 4A:
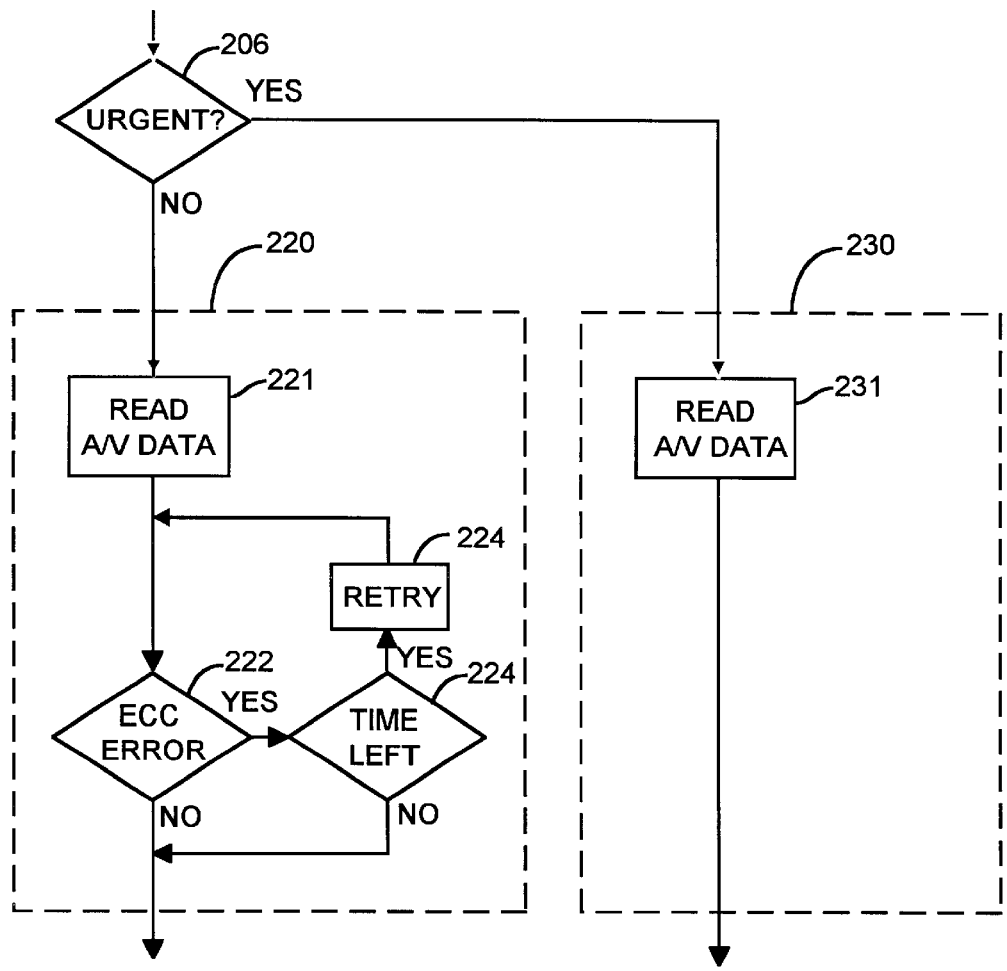
FIG. 4A is a first example of processing wherein the disk drive of FIG. 1 reads ANV data with standard precedence or with urgent precedence as a function of the urgent bit in a read command according to FIG. 3.

FIG. 4A, reviewed with reference to FIG. 2, illustrates a first example of how the status of the Urgent Bit 129 may cause distinct processing within the standard processing block 220 on the hand and within the urgent processing block 230 on the other hand. Here, the distinction relates to the limited-time time ordinarily permitted for error processing. This example makes two assumptions. First, it assumes that disk drive 30 encodes the data with a certain number of redundant bits that permit Error Correction Code (ECC) to correct a limited number of mis-read bits (say 2 or 3). This correction process is often called "ECC on the fly" to distinguish it from other subsequent correction efforts such as simple retries and other even more "heroic" correction efforts. Second, it assumes that the default AV mode set in Step 202 imposes time-limited error processing to ensure that the AV data to be read is accomplished in sufficient time to maintain streaming.

In the standard processing block 220, the transfer command is performed with the possibility that some error processing beyond ECC-on-the-fly (e.g. a retry) may take place within the time-limited error-processing permitted under the default AV mode. At step 221, the read command is executed. At step 222, the system checks for an uncorrectable ECC on-the-fly error, (an ECC OTF error.) If there is no ECC OTF error, the data is returned. On the other hand, if there is an ECC OTF error, further error correction efforts may take place. At step 223, the system checks to see if there is time left in the corresponding command slot 51, 52, 53 (see FIG. 2). If there is, then the system attempts to correct the error. At step 224, the system is shown to implement a simple retry, but other error correction routines may be used.

In the urgent processing block 230, on the other hand, the transfer command is performed with ECC, but without any allowance whatsoever for further error processing in the event of an ECC OTF error due to the host 36 having set the Urgent Bit. At step 231, therefore, the AV data is read and passed on, as is, error or no error.

Figure 4B:
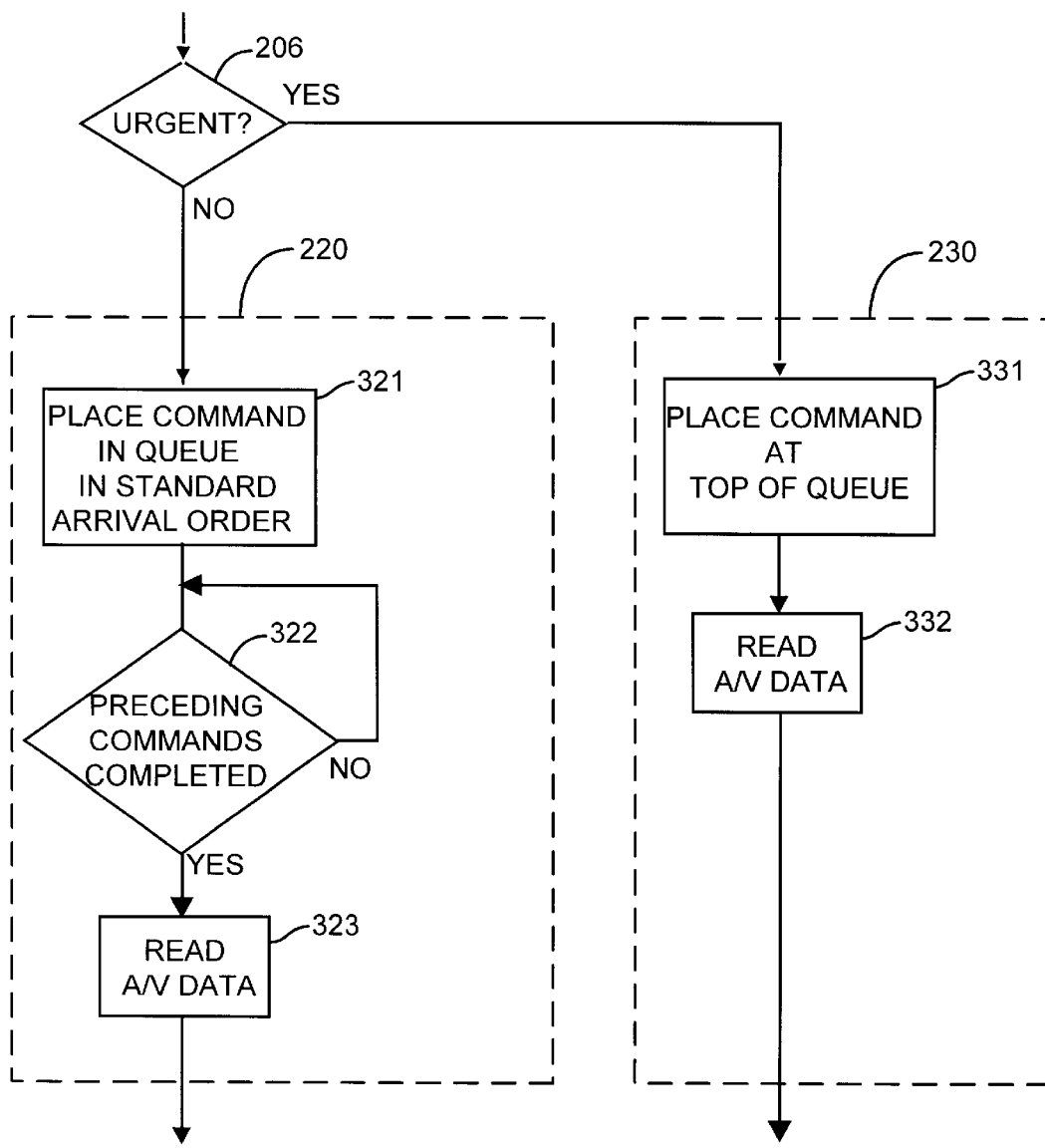
FIG. 4B is a second example of processing wherein the disk drive locates an audiovisual command in a standard arrival order within a command queue or at the top of the queue as a function of the urgent bit in a read command according to FIG. 3.

FIG. 4B, also reviewed with reference to FIG. 2, illustrates a second example that presumes that the disk drive 30 maintains a command queue using, for example, a linked list structure. In this example, the standard processing block 220 transfers the requested AV data in the usual order, i.e. only after processing all preceding commands, whereas the urgent processing block 230 moves the urgent command to the head of the line and immediately processes the urgently required AV data.

More particularly, in the standard processing block 220, at step 321, the system places the new host command in the queue in a standard arrival order and then, at step 322, waits for other prior commands to complete before reading the requested AV data at step 323. In the urgent processing block 230, on the other hand, the system places the urgent host command at the top of the queue at step 331 for immediate reading at step 332.

Figure 4C:
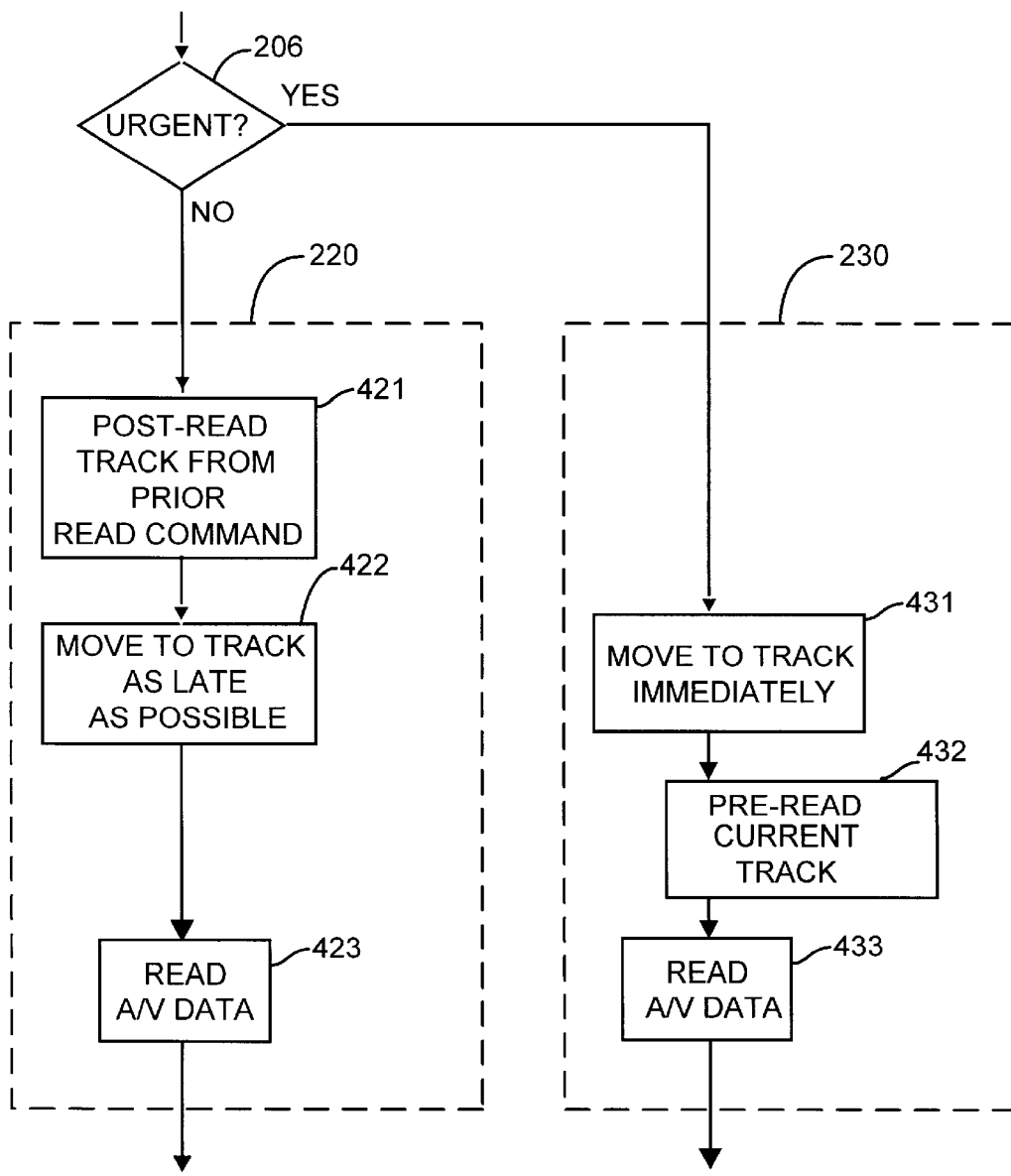
FIG. 4C is a third example of processing wherein the disk drive continues a post-reading operation as late as possible or immediately moves to the track containing the newly requested ANV data as a function of the urgent bit in a read command according to FIG. 3.

FIG. 4C, also reviewed with reference to FIG. 2, illustrates a third example relating to how the disk drive 30 spends its time before and after reading or writing "user-requested" data as specified by the host 36. With a READ command, for example, the disk drive 30 must move the head on-track and then often "wait" for the data on the rotating disk 46 to reach the head 64. During that otherwise wasted time, the disk drive 30 normally "pre-reads" data from the track and stores that data in the disk's buffer memory 82 since it is statistically likely that the host 36 will subsequently need such data. In like fashion, after reading the requested data and determining that the disks 46 may continue to rotate for some distance before it is necessary to move the heads 48, the disk drive 30 may temporarily linger on the same track to "post-read" more data and store such data in a read segment within the disk buffer memory 82 before moving to the next track specified in the next command.

An already urgent data stream is likely to continue to be urgent. Future frames or segments are less likely to be dropped, therefore, if the system pre-loads the drive's buffer memory 82 with data that may be associated with the already urgent data stream.

In the standard processing block 220, the disk drive 30 performs the pre-reads and post-reads in the normal fashion. In particular, the disk drive "post-reads" data from the track associated with the prior command at step 421, moves to the track associated with the current host transfer command 120 as late as possible at step 422, and then reads the AN data requested in the host transfer command at step 423.

In the urgent processing block 230, the disk drive 30 eliminates the post-read associated with a previous non-urgent command and positions the head on the track associated with the urgent command as soon as possible to begin pre-reading data that is statistically more likely to be associated with the known-urgent data. In particular, the disk drive moves to the track associated with the current host transfer command 120 as soon as possible at step 431, pre-reads that track at step 432, and ultimate reads the A/V data requested in the host transfer command at step 433.

Figure 4D:
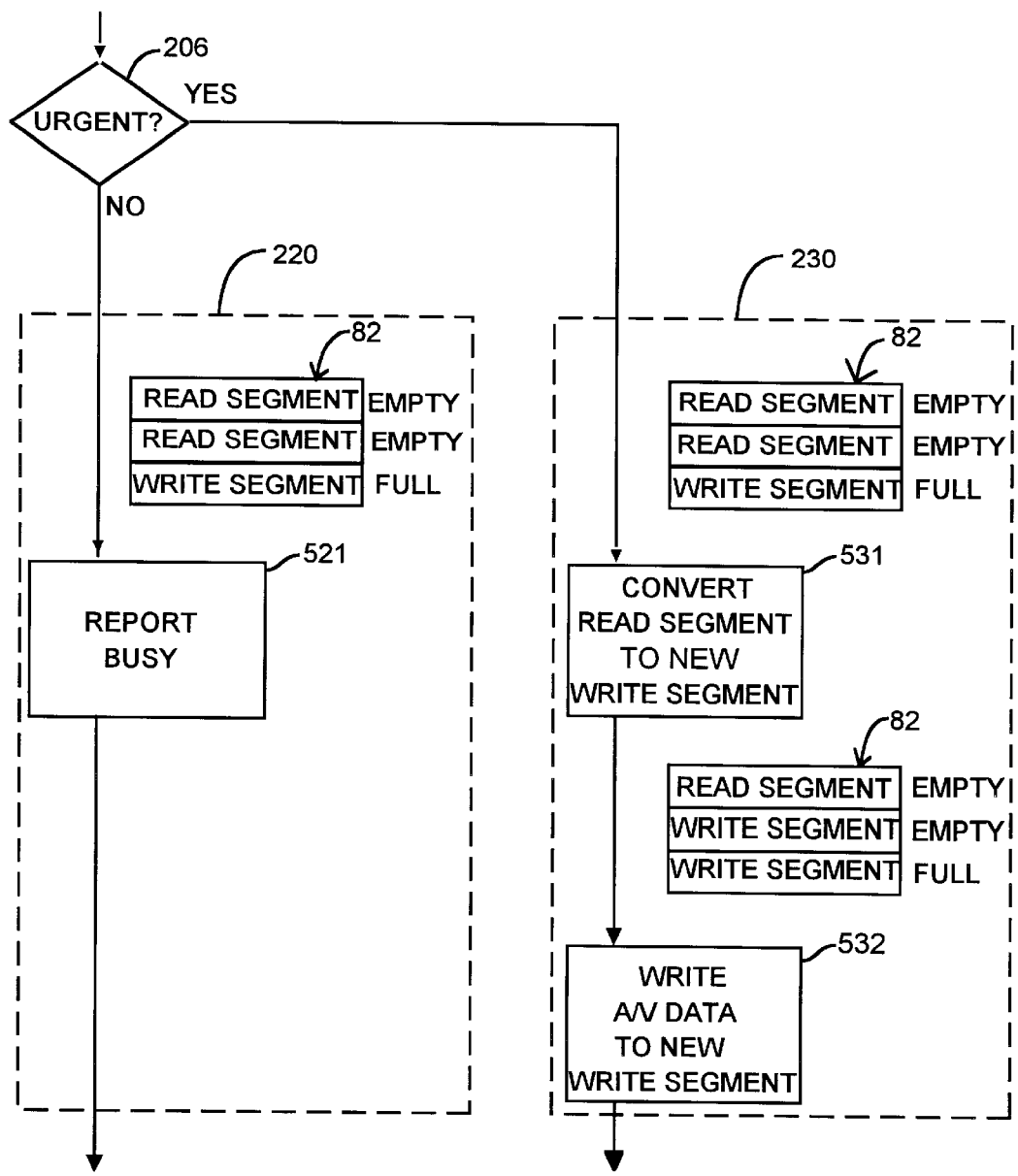
FIG. 4D is a fourth example of processing wherein the disk drive either postpones command execution by reporting busy status or converts a read segment to a write segment as a function of the urgent bit in a write command according to FIG. 3.

FIG. 4D, reviewed again with reference to FIG. 2, illustrates a fourth example related to buffer control when writing A/V data under a buffer full condition. In this case, the status of the Urgent Bit 129 may cause distinct buffer processing within the standard and urgent processing blocks 220, 230. In more detail, the disk buffer memory 82 of FIG. 1 is shown here to have three segments that is initially configured to have two "read segments" (both empty) and one "write segment" (full). In the standard processing block 220, at step 521, the HIDC 74 simply reports that the disk is "busy" when the disk buffer memory 82 is full. In the urgent processing block 320, on the other hand, the HIDC 74 converts an read segment into a write segment at step 531 and then writes the new NV data into the new write segment at step 532.

We claim:

1. A method of operating a disk drive that is adapted for storing an audiovisual data stream on a disk and for rapidly reading or writing successive portions of the audiovisual data stream in response to commands that arrive from a host under a variety of operational circumstances including other drive operations and includes the step of setting a default operating mode for responding to the commands which gives standard precedence to transferring the audiovisual data stream relative to attending to another drive operation, the default operating mode including a read continuous mode which causes the disk drive to continuously read successive portions of a subsequently requested audiovisual data stream without regard to error, the method comprising the further steps of:

receiving a new transfer command requiring the transfer of a data segment associated with the audiovisual data stream;

determining an absence or presence of an urgent condition with regard to the new transfer command;

according standard precedence to processing the audiovisual data stream associated with the new transfer command as specified by the default operating mode in the determined absence of the urgent condition; and according urgent precedence to processing the audiovisual data stream associated with the new transfer command over attending to the other drive operation in the determined presence of the urgent condition without regard to the default operating mode.

2. The method of claim 1 wherein the new transfer command includes an urgent bit that may be set and reset by the host on a command by command basis.

3. The method of claim 1 wherein the other drive operation is an error correction effort that is normally taken under the default operating mode.

4. The method of claim 3 wherein the step of according standard precedence to processing the audiovisual data stream associated with the new transfer command comprises the substeps of:

reading audiovisual data as requested by the new transfer command;

applying ECC on the fly;

determining if there is an ECC on the fly error; and re-reading the audiovisual data if there is an ECC on the fly error.

5. The method of claim 3 wherein the step of according urgent precedence to processing the audiovisual data stream associated with the new transfer command comprises the substep of reading the audiovisual data as requested by the new transfer command without permitting re-reading the audiovisual data if there is an ECC on the fly error.

6. The method of claim 1 wherein the disk drive includes a command queue and wherein the other drive operation is the processing of an earlier-received command.

7. The method of claim 6 wherein the new transfer command requires a read operation and wherein the step of according standard precedence to processing the audiovisual data stream associated with the new transfer command comprises the substeps of:

placing the new transfer command in the command queue in the order it was received; and processing previously-received command; and reading audiovisual data as requested by the new transfer command.

8. The method of claim 6 wherein the step of according urgent precedence to processing the audiovisual data stream associated with the new transfer command comprises the substep of placing the new transfer command at the top of the command queue.

9. The method of claim 1 wherein the other drive operation is a post-read process associated with a previous read command.

10. The method of claim 9 wherein the step of according standard precedence to processing the audiovisual data stream comprises the substeps of:

post-reading data from a track associated with the previous read command as late as possible;

moving to a track associated with the new transfer command; and reading audiovisual data as requested by the new transfer command.

11. The method of claim 9 wherein the step of according urgent precendence to processing the audiovisual data stream comprises the substeps of:

moving to a track associated with the new transfer command immediately;

pre-reading data from the track associated with the new transfer command; and reading audiovisual data as requested by the new transfer command.

12. The method of claim 1 wherein the disk drive includes a disk buffer memory and wherein the other drive operation is a buffer operation.

13. The method of claim 12 wherein the new transfer command requires a write operation, wherein a write segment in the disk buffer memory is full, and wherein the step of according standard precedence to processing the audiovisual data stream comprises the substep of reporting that the write segment is full.

14. The method of claim 12 wherein the new transfer command requires a write operation, wherein a write segment in the disk buffer memory is full, and wherein the step of according urgent precedence to processing the audiovisual data stream comprises the substeps of:

converting an empty read segment to a write segment; and writing audiovisual data as requested by the new transfer command.

15. The method of claim 1 wherein the other drive operation is a queued command.

16. The method of claim 15 wherein the step of according urgent precedence to the new host command is accomplished by deferring the queued command to a later time.

17. The method of claim 15 wherein the queued command relates to another audiovisual data stream.

18. The method of claim 15 wherein the queued command relates to the transfer of non-time critical, non-AV computer data.

* * * * *